(12) United States Patent
Priepke et al.

(10) Patent No.: US 7,575,077 B2
(45) Date of Patent: Aug. 18, 2009

(54) LEVER CONNECT PTO MODULE FOR THREE-POINT HITCH QUICK COUPLER

(75) Inventors: Edward H. Priepke, Lancaster, PA (US); Douglas S. Fitzkee, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 21 days.

(21) Appl. No.: 11/562,488

(22) Filed: Nov. 22, 2006

(65) Prior Publication Data

US 2008/0115983 A1    May 22, 2008

(51) Int. Cl.
*B60K 17/28* (2006.01)

(52) U.S. Cl. .................. 180/53.3; 172/47; 172/272; 180/14.4

(58) Field of Classification Search ............ 172/47, 172/272, 439; 180/53.6, 53.61, 53.62, 53.3, 180/53.7, 14.4
See application file for complete search history.

(56) References Cited

U.S. PATENT DOCUMENTS

| | | | |
|---|---|---|---|
| 1,538,881 A * | 5/1925 | Barton | 180/53.7 |
| 2,248,332 A | 7/1941 | Budelier et al. | |
| 2,253,431 A | 8/1941 | Johansen | |
| 2,658,396 A * | 11/1953 | Christiance | 74/96 |
| 2,869,660 A | 1/1959 | Miller et al. | |
| 3,007,535 A * | 11/1961 | Lippke | 180/14.1 |
| 3,074,501 A * | 1/1963 | Lane et al. | 180/14.1 |
| 3,204,731 A | 9/1965 | Bent et al. | |
| 3,283,840 A * | 11/1966 | Lane | 180/14.1 |
| 3,702,639 A | 11/1972 | Womble et al. | |
| 3,760,920 A | 9/1973 | Delfeld | |
| 3,961,677 A | 6/1976 | Geisthoff | |
| 3,982,670 A | 9/1976 | Brass | |
| 4,071,105 A * | 1/1978 | von Allworden | 180/14.4 |
| 4,090,725 A | 5/1978 | Perin | |
| 4,176,727 A * | 12/1979 | Perin | 180/53.3 |
| 4,349,092 A | 9/1982 | Geisthoff | |
| 4,359,952 A | 11/1982 | Gesior et al. | |
| 4,433,767 A * | 2/1984 | Thor | 192/69.61 |
| 4,479,568 A | 10/1984 | Palazzolo et al. | |
| 4,492,292 A | 1/1985 | Thor | |
| 4,799,563 A | 1/1989 | Yukino | |
| 4,884,639 A * | 12/1989 | Nozaka et al. | 172/47 |
| 4,887,680 A * | 12/1989 | Nozaka et al. | 180/53.3 |
| 4,934,471 A * | 6/1990 | Tanaka et al. | 180/14.4 |
| 4,944,354 A * | 7/1990 | Langen et al. | 172/47 |
| 5,040,654 A | 8/1991 | Trommer | |
| 5,303,790 A * | 4/1994 | Coleman | 180/53.3 |
| 5,333,712 A | 8/1994 | Sabee et al. | |
| 5,667,330 A * | 9/1997 | Henkel et al. | 403/328 |
| 6,073,742 A | 6/2000 | Gersmann | |
| 6,247,867 B1 | 6/2001 | Speer | |
| 7,220,075 B2 * | 5/2007 | Herchenbach et al. | 403/57 |
| 7,278,502 B2 * | 10/2007 | Trefz et al. | 180/53.1 |
| 2006/0055140 A1 | 3/2006 | Trefz et al. | |

* cited by examiner

*Primary Examiner*—Thomas B Will
*Assistant Examiner*—Matthew D Troutman
(74) *Attorney, Agent, or Firm*—Patrick M. Sheldrake; John William Stader; Michael G. Harms (57) ABSTRACT

A lever-operated PTO shaft connection mechanism for use with a three-point hitch quick coupler that aligns and engages the PTO driveline between a tractor and a powered implement.

16 Claims, 6 Drawing Sheets

LEVER CONNECT PTO MODULE FOR THREE-POINT HITCH QUICK COUPLER

BACKGROUND OF THE INVENTION

The present invention relates generally to coupling devices for connecting a tractor or other similar prime mover to a hitch-mounted implement, and more particularly to latching a quick attaching coupler and engaging a power take off from a tractor to the hitch-mounted implement.

Quick attaching couplers have been developed to allow faster attachment of hitch mounted implements to a tractor. Many quick attaching couplers comprise an inverted U-shape arched frame that is attached to the conventional three pivot points of a tractor hitch. The quick attaching coupler frame includes an upper hook with a long, tapered point and two lower coupling hooks or jaws with a latching and unlatching arrangement to hold the implement hitch pins. To couple an implement using the quick couplers the coupler is lowered by positioning the tractors three point hitch and the tractor positioned near the implement with the coupling hooks adjacent the implement hitching pins. Then the hitch and connected quick coupler is then raised with the tractor hydraulic system so that the upper hook engages the upper pin on the implement. Further lifting causes the weight of the implement to force the lower hitch pins to enter the lower hooks where they may be latched in place by the tractor operator to secure the implement.

The latches may be spring loaded to the locked or latched position. Locking the latches may be accomplished by having the operator dismount the tractor seat to manually operate two locking mechanisms for the two hitch pins. Some quick attaching couplers incorporate one or more levers that enable the operator to remain seated on the tractor while locking the latches.

Tractors may be equipped with a power take off (hereinafter "PTO") drive that provides a mechanism for transmitting rotary power from the engine to implements that are coupled to a tractor. The PTO is most commonly a rotating splined shaft which projects rearwardly from the rear of the tractor frame for a short distance; however, some tractors have auxiliary PTO shafts at other locations, such as at the front of the tractor. The direction of rotation, rotational speed; approximate location and exact dimensions of the PTO shaft are standardized to provide the ability to interchange between power shafts of various implements made by different manufacturers. The PTO shaft of a tractor is typically driven at either 540 rpm or 1,000 rpm. It is well understood in this field of invention that the PTO shaft rpm varies with engine speed and the rotational speeds of 540 rpm and 1,000 rpm are typically the standard "rated" speeds for PTO driven implements. Although the PTO described herein projects rearwardly from the tractor, it should be appreciated that the invention described relates to any PTO, regardless of location on a prime mover.

Most hitch-mounted implements have a driveline comprised of a telescoping, splined drive shaft which can be extended to connect at one end to the splined interface of the tractors PTO while the other end connects to the rotary input connection (typically a gearbox input) for the implement. The driveline typically includes two or more universal or constant velocity joints, or the like, to allow angular movement of the implement and tractor relative to one another without binding the driveline.

Connecting the PTO driveline assembly to the tractor PTO can be cumbersome, especially in the case of three point hitch-mounted implements which may have limited accessibility to the PTO connection area. The object of a quick attaching coupler is to simplify the process of connecting an implement to a tractor hitch; however, requiring an operator to manually connect the PTO imposes a sometimes difficult and time-consuming task in the hitching process thereby diminishing some benefits of the quick attaching coupler. Connecting the driveline generally requires that the implement drive shaft be lifted into position for engaging the PTO splined connection. The drive shaft must often be manually rotated to align the splines while simultaneously holding the weight of the driveline assembly. This task is time consuming, dirty, and often difficult for the operator, particularly if he/she is of small physical stature or handicapped. Performing the task also increases the potential for operator injury.

It would be desirable to provide an apparatus for engaging the PTO connection for use with a quick connect hitch that relies on the hitch latching apparatus of the quick connect hitch to engage the PTO when the hitch is connected, thereby eliminating the need to separately, manually connect the PTO driveline.

SUMMARY OF THE INVENTION

Accordingly, it is an object of the present invention to provide a bolt-on module for an ASAE S278.6 three-point hitch quick coupler that provides a mechanism to connect the implement PTO driveline and the tractor PTO by use of a simple lever and/or hydraulics.

It is another object of the present invention to provide an improved PTO shaft connection apparatus that reduces the amount of time and level of physical difficulty required for connecting the tractor PTO shaft to the hitch-connected work implement.

It is a further object of the present invention to provide an improved PTO shaft engagement apparatus that may be operated without requiring the operator to dismount the tractor.

It is a further object of the present invention to provide an improved PTO driveline shaft connection apparatus that is self-aligning during engagement, thereby eliminating the need for the operator to manually position the driveline during engagement.

It is a still further object of the present invention to provide an improved PTO driveline shaft connection apparatus that improves the ease of connecting an implement PTO.

It is a still further object of the present invention to provide an improved PTO engagement apparatus that is durable in construction, inexpensive of manufacture, carefree of maintenance, easily assembled, and simple and effective to use.

These and other objects are achieved by providing a lever-operated PTO shaft connection mechanism for use with a three-point hitch quick coupler that aligns and engages the PTO driveline between a tractor and a powered implement.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
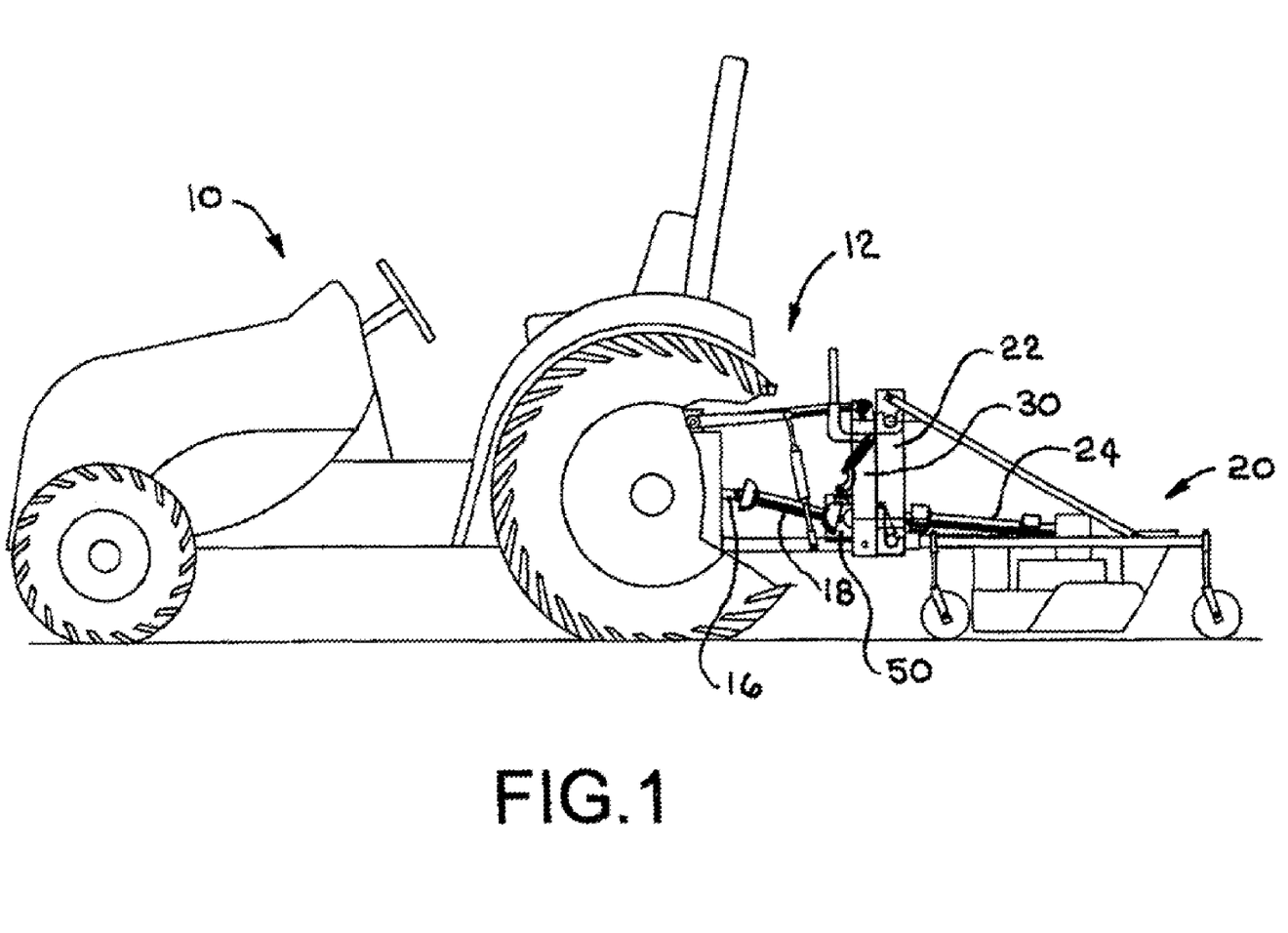
FIG. 1 is a diagrammatic side view of a tractor and a hitch connected powered implement of the type on which the present invention is useful.

Referring to FIG. 1, tractor 10 is shown having three-point hitch 12 for selectively positioning a connected implement 20. Three-point hitch 12 incorporates a quick coupler 30 to enable the implement 20 to be quickly connected to the tractor 10 with minimal operator effort. Quick couplers are well known in the art, particularly those having design criteria set by ANSI standard ASAE S278.6 to assure compatibility among manufacturers. Implement 20 is attached to quick coupler 30 by implement hitch frame 22. As shown, implement 20 is a powered implement, such as a spreader, rotary mower, rotary tiller and the like, which receives rotary input power from tractor PTO 16. Rotary motion is transferred from the tractor PTO 16 to the implement via a PTO driveline comprising telescoping shaft 18, a torque coupler (not shown) contained within the connection module 50, and implement driveline 24.

Figure 2:
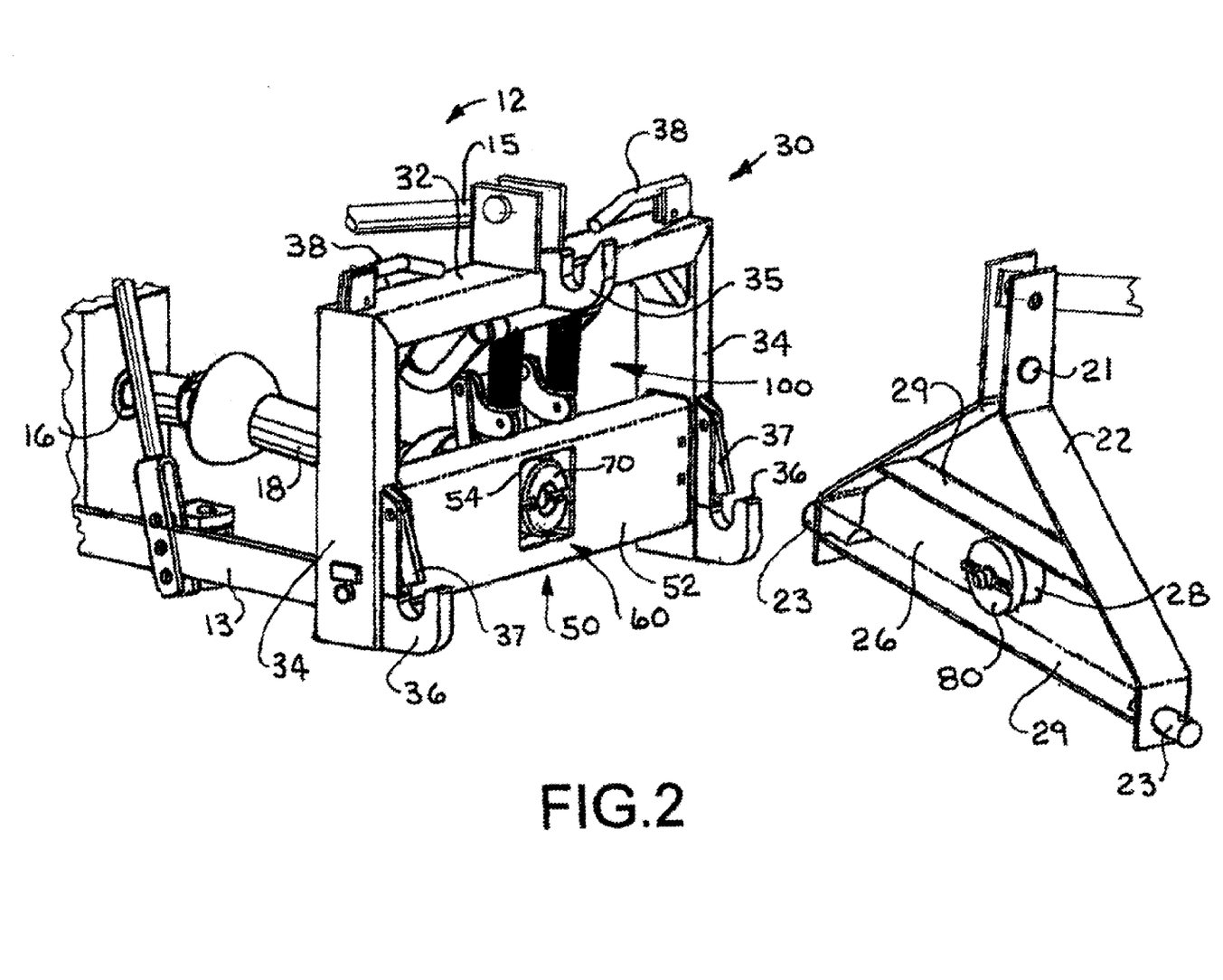
FIG. 2 is a perspective view of the invention showing the interface details of the quick-connect hitch and torque coupling.

In FIG. 2, quick coupler 30, PTO connection module 50 and the implement hitch frame 22 are shown separated. Quick coupler 30 comprises an inverted U-shape frame 32 which includes spaced-apart connections for pivotable connection to the lift arms 13 and upper link 15 of the tractor's three-point hitch 12. As normally arranged when connected to a tractor hitch, the plane of the inverted U-shape frame 32 is generally transversely and vertically disposed with respect to the tractor 10, being adjacent to the tractor in one direction and adjacent to the implement in the opposite direction. Top hook 35 and a pair of bottom hooks 36 are connected to the inverted U-shape frame 32 facing the implement 20 for engaging with implement hitch top and bottom pins 21, 23. Each bottom hook 36 has a locking tab 37 to secure bottom pins 23 in position and prevent the implement 20 from inadvertently disengaging. Connecting an implement to the quick coupler requires engaging the implement top pin 21 in the top hook 35 and then slightly raising the three-point hitch 12. Upward hitch movement causes the implement to pivot slightly bringing the bottom implement hitch pins 23 toward the bottom hooks 36. Once bottom pins 23 engage bottom hooks 36, locking tabs 37 are engaged to retain the implement 20 connected to the quick coupler 30. Control of locking tabs 37 is typically by one or more levers 38 manually operable by the operator, though hydraulically actuated locking tabs may also be used.

Also shown in FIG. 2 is the preferred embodiment of the present invention. PTO connection module 50 is a bolt-on apparatus that allows the module 50 to be easily connected to the inverted U-shape frame 32 of the quick coupler 30. PTO connection module 50 includes a transverse frame 52 which connects to and spans between the vertical side members 34 of the inverted U-shape frame 32. Transverse frame 52 provides a mounting location for the drive member of a torque coupler 60 and the engagement mechanism 100 of the invention (illustrated in FIGS. 3 and 4). An opening 54 in transverse frame 52 allows the PTO driveline to pass through the frame so rotational motion may be transferred from the tractor PTO 16 to the implement driveline 24 through the torque coupler 60. In one embodiment, transverse frame 52 is connected to the inverted U-shape frame 32 using bolted connections thereby allowing the PTO connection module 50 to be retrofit onto an existing quick coupler 30. In another embodiment, transverse frame 52 is integral to the quick coupler frame 32 as is useful for manufacturing a combined quick coupler and PTO connection module. Though shown as a structural member spanning between the vertical side members 34 of the inverted U-shaped frame 32, numerous structures are conceivable and capable of providing a rigid mounting location for the PTO connection module 50.

Implement frame 22 includes a transversely disposed driveline mounting structure 26 to provide a connection location for the implement driveline 24 and the driven member 80 of the torque coupling 60. Implement driveline bearing 28 connects implement driveline 24 to the mounting structure 26. Implement driveline bearing 28 locates the driveline 24 in both radial and axial directions, thereby maintaining the driven member 80 of the torque coupling in a generally fixed position relative to the implement frame 22. Mounting structure 26 may also include driveline shields 29 which create a recessed structure surrounding the torque coupling 60. As the implement 20 is connected to the tractor quick coupler 30, the drive shields 29 are positioned such that they extend toward and adjacent to the top and bottom portions of the transverse frame 52. The drive shields 29 form an enclosure around the torque coupling 60 consisting of the transverse frame 52, the driveline mounting structure 26, and the drive shields 29 which prevent inadvertent contact with the rotating torque coupling 60 during implement operation.

Figure 3:
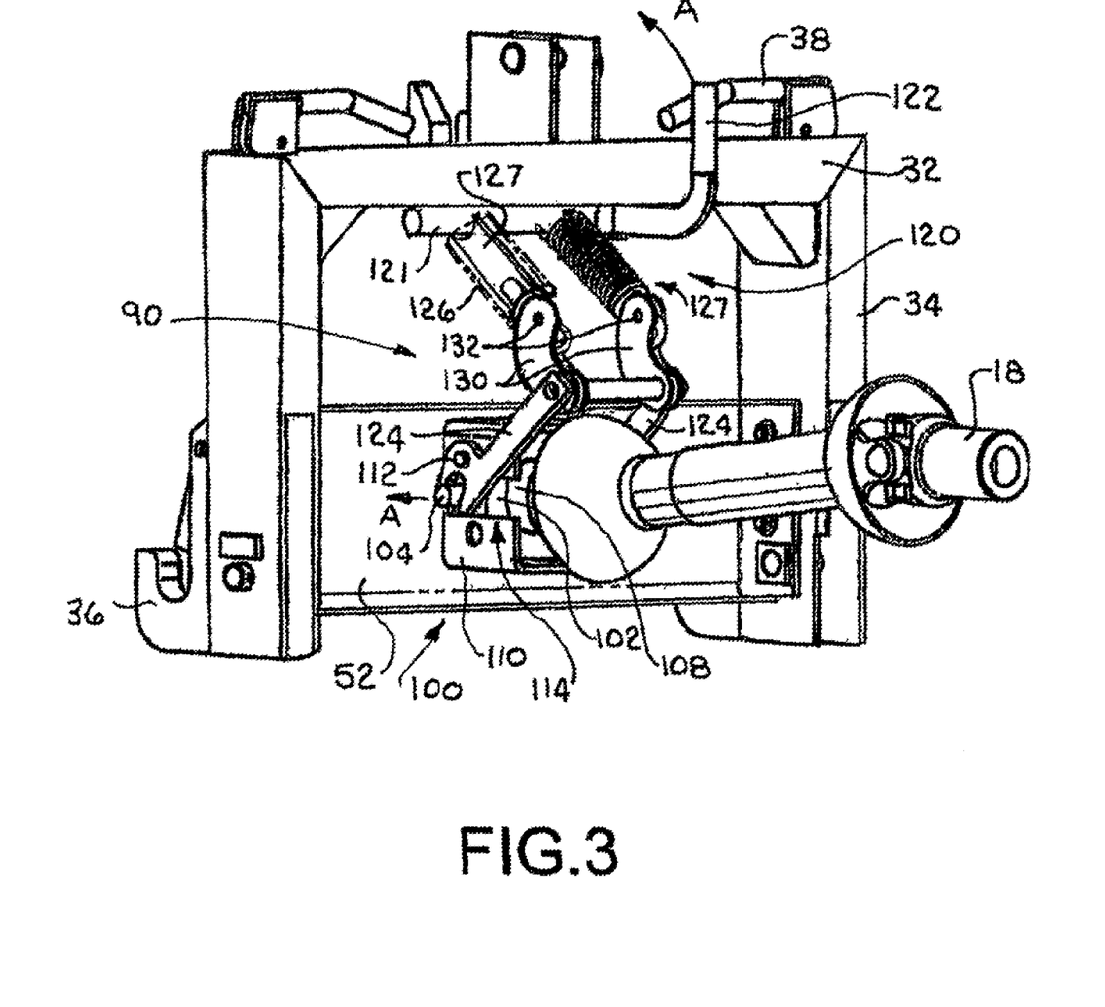
FIG. 3 is a perspective view of the connection module viewed from the tractor showing the movable fork mechanism in the engaged position.
Figure 4:
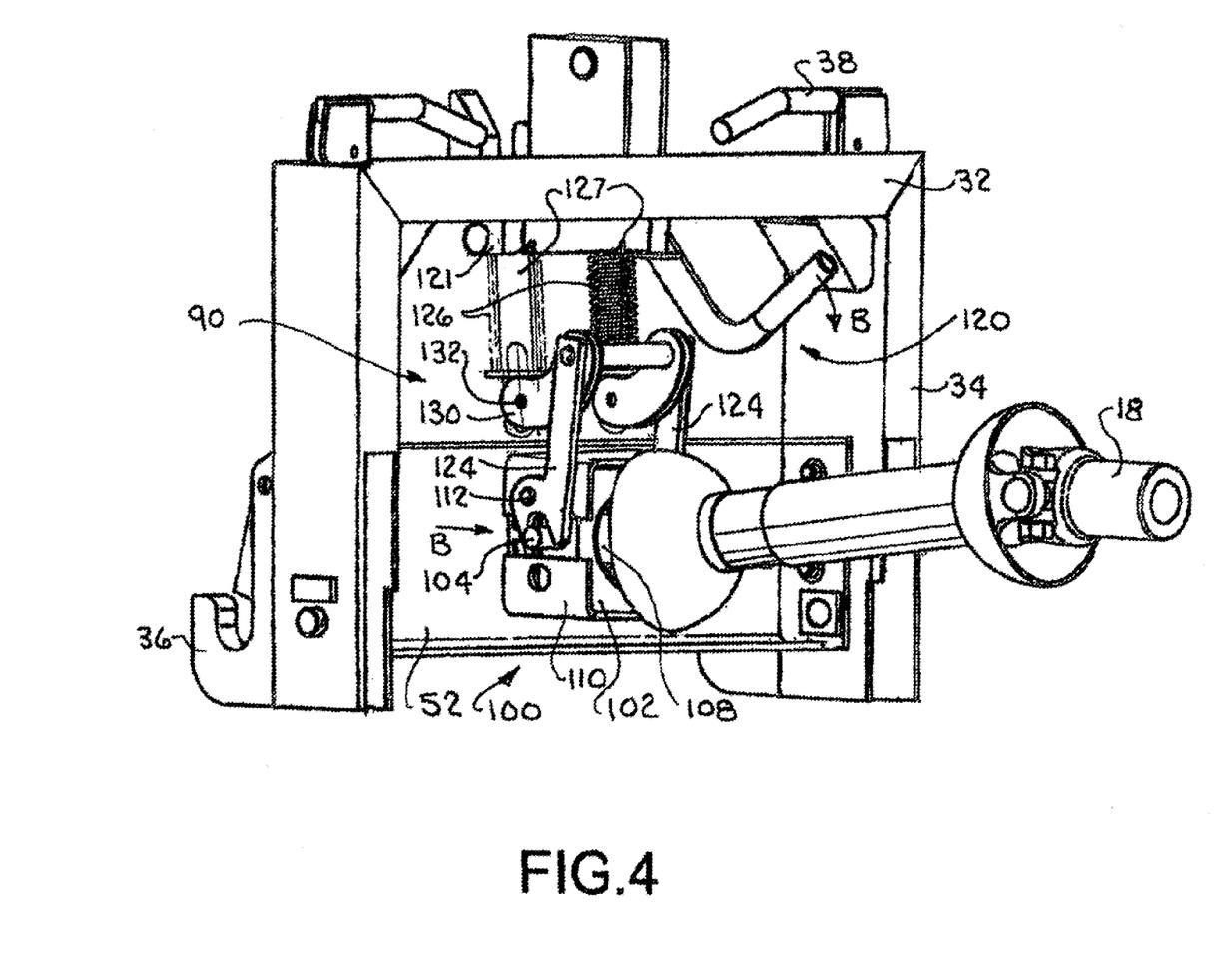
FIG. 4 is a perspective view of the connection module viewed from the tractor showing the movable fork mechanism in the disengaged position.

Referring now to FIGS. 3 and 4, where the forward end of the quick coupler 30 and PTO connection module 50 are isometrically presented to detail the PTO engagement mechanism 90. The engagement mechanism 90 comprises a lever actuator mechanism 120 operating on a coupler engagement apparatus 100 that positions bearing housing 102 which in turn supports a telescoping end of the PTO driveline telescoping shaft 18. The coupler engagement apparatus 100 features a spring-engagement that permits a limited amount of axial and rotational misalignment between the drive and driven members of the torque coupler, which is then corrected as the torque coupler is engaged and the driveline begins to rotate. The coupler engagement apparatus 100 also provides a "floating" interface the PTO driveline and the transverse frame 52 allowing the self-centering features of the torque coupler, described later herein, to align the two mating ends of the driveline (i.e. the tractor PTO and the implement driveline). Bearing guide channel 110 and thrust bearing housing 102, which has a pair of opposing positioning tabs 104 extending from the outer periphery of thrust bearing housing 102 through slotted guides 114 in opposing sides of the bearing guide channel 110 to allow the thrust bearing housing 102 to move forwardly/rearwardly controlled by lever actuator mechanism 120. As lever actuator mechanism 120 moves the thrust bearing housing 102 forwardly/rearwardly in the bearing guide channel 110, the torque coupling is moved between engaged and disengaged positions. Interaction between the position forks 124 (part of the actuator mechanism 120) and positioning tabs 104 moves the thrust bearing housing 102 and thus the drive member of the torque coupling (not shown). Telescoping shaft 18 accommodates the forward/rearward movement of the thrust bearing housing 102 and transfers rotational motion from the tractor PTO 18 to the implement via the torque coupler.

The lever actuator mechanism 120 includes lever 122, toggle link 130, positioning forks 124, pivot pins 112 and one or more engagement springs 126. Lever 122 connects to an actuator shaft 121 in a manner to allow rotation of the actuator shaft 121 by movement of the lever 122. One or more spring guides 127 are also connected to shaft 121 and oriented perpendicular to the shaft axis of rotation to extend radially away from the actuator shaft 121. The distal end of spring guide 127 includes a slotted structure 128 (shown in FIGS. 7 & 8) that guides the connection with one end of toggle link 130. Engagement spring 126 is constrained by actuator shaft 121 and toggle link 130; the slotted structure 128 allows the distance between the shaft 121 and the toggle link 130 to vary, compressing or decompressing the spring 126 depending upon the position of the lever 121 and the positioning forks 124. Toggle link 130 is pivotally connected at one end to positioning forks 124. The opposing end of toggle link includes a guide 132 engaged in slotted structure 128 to constrain the connection between the toggle link 130 and the spring guide 127. Positioning forks 124 pivot about pivot pins 112, one end of the forks being pivotally connected to toggle link 130 and the other end acting upon positioning tabs 104. Movement of lever 122, through the engagement mechanism 90 herein described, causes movement of the bearing housing 102 in extending and retracting directions. The movement is shown as arrow "A" in FIG. 3 for the engaged position, and as arrow "B" in FIG. 4 for the disengaged position. The configuration of the lever actuator mechanism 120 linkage provides spring-controlled motion during motion toward the engaged position to accommodate rotary misalignment of the torque coupler members (as described in greater detail later herein). The linkage design also incorporates an over-center locking feature to maintain the linkage in the engaged position until disengaged by operation of lever 122. Other linkage arrangements may be equally suitable for the application and are contemplated within the scope of the invention.

Figure 5:
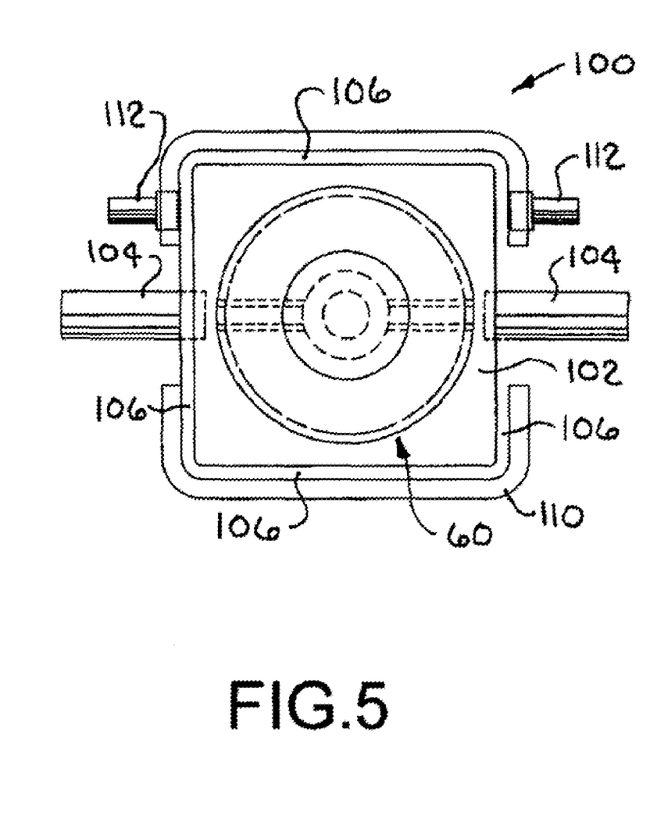
FIG. 5 is an elevation view of a portion of the torque coupling and the bearing housing structure.
Figure 6:
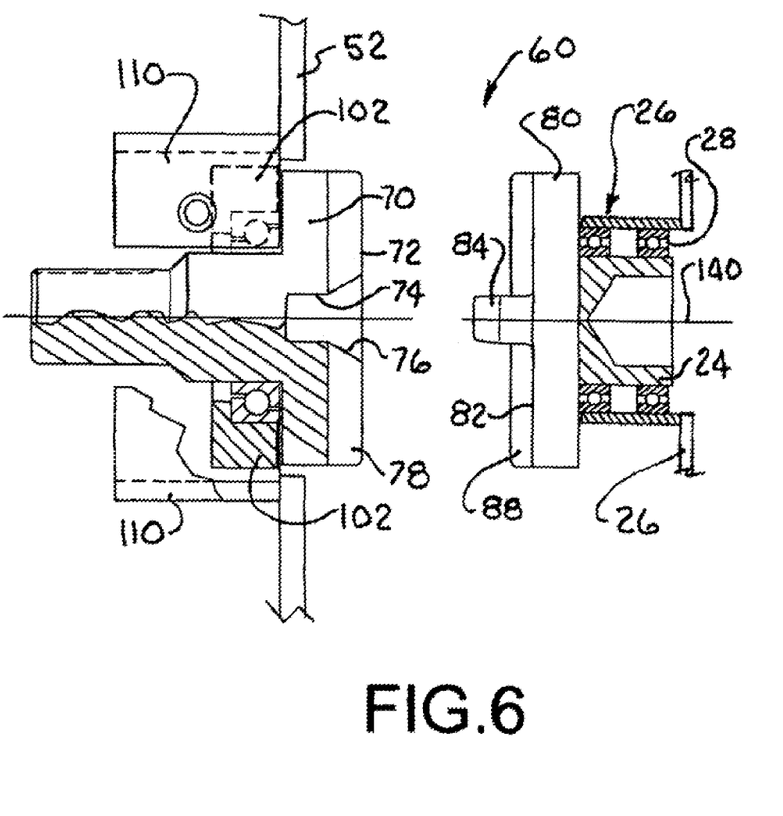
FIG. 6 is a partial section view of the drive and driven portions of the torque coupling.

Referring now to FIGS. 5 and 6, an elevation view of a portion of the coupler engagement device 100 is presented. The coupler engagement device 100 is shown including the thrust bearing housing 102 and the bearing guide channel 110. Dimensions of the outer perimeter of thrust bearing housing 102 and the interior perimeter of the bearing guide channel 110 differ to create a small alignment gap 106 between the bearing housing 102 and the guide channel 110. Centering springs may be used to retain the bearing housing 102 in a central position within the guide channel 110 and prevent unwanted vibration. The alignment gap 106 allows the drive member 70 of the PTO shaft torque coupler 60 to float (i.e. move in radial directions) in relation to the fixed structure of the guide channel 110 (which is attached to the transverse frame 52), that is to move radially relative to the shaft rotational axis.

FIG. 6 displays the drive member 70 and driven member 80 of the torque coupler 60. The drive member 70 is the endmost portion of the tractor side of the PTO driveline away from the tractor while the driven member 80 is typically disposed on an end of the implement driveline closest to the hitch. Driven member 80 includes a generally circular driven face 82 aligned perpendicularly to the axis of rotation 140 of the torque coupler 60. Alignment pin 84 is a cylindrically shaped structure centrally disposed along on the axis of rotation 140 and extends away from the surface of the driven face 82. Drive member 70 of torque coupler 60 comprises a generally circular drive face 72 matching the opposing driven face 82 on the coupler driven portion 80. Drive member 70 includes and an alignment pin receiver 74 configured to guide and receive alignment pin 84 as the separation between opposing drive and driven faces 72, 82 is reduced by operation of the engagement mechanism. Alignment pin receiver 74 is formed to provide a close-fitting receptacle for the alignment pin 84 so that the opposing members of the torque coupler 60 will be axially alignment when the torque coupler 60 is fully engaged. The alignment pin receiver 74 features a conically tapered region 76 adjacent to drive face 72 and concentrically aligned with the alignment pin receiver 74 to guide the alignment pin 84 toward an axially central position as the two portions of the coupler are moved toward engagement with each other. In the event of misalignment in the torque coupler, the floating design of the coupler engagement apparatus 100 allows the drive member to move radially until its rotational axis aligns with axis of rotation 140.

Engaging the PTO engagement mechanism 90 causes engagement of torque coupler 60 by moving drive member 70 rearward toward driven member 80 thereby causing the opposing drive and driven faces 72, 82 to contact one another. When the engagement mechanism is in the disengaged position, drive and driven members 70, 80 of the torque coupling 60 are spaced apart so that rotation of drive member 70 will not cause rotation of driven member 80. The disengaged position is established when the implement 20 is connected to the quick coupler 30, but the PTO engagement mechanism is not repositioned to the engaged position by the operator. By moving lever 122 of lever actuator mechanism 120 from the disengaged to the engaged position, drive member 70 is urged rearward toward driven member 80 through action of the actuator mechanism 120 and coupler engagement apparatus 100. The rearward movement of drive member 70 causes alignment pin 84 to be directed toward alignment pin receiver 74. Interaction of conically tapered region 76 of the alignment pin receiver 74 and alignment pin 84 cause the drive member 70 to move radially with respect to the axis of rotation 140 in order to align both portions of the torque coupler 60 along on a single axis of rotation 140. This radial movement is accommodated by the limited degree of float allowed by the alignment gap 106 between the bearing guide channel 110 and the thrust bearing housing 102. As the separation between coupler drive and driven faces 72, 82 is reduced by motion of drive member 70, driven rib 88, which extends away from and is radially oriented on driven face 82, will most likely contact the opposing drive face instead of aligning with the mating drive groove 78 on drive member 70. Only when both coupler members are perfectly rotationally aligned will driven rib 88 interlockingly engage drive groove 78 and allow full engagement of torque coupler 60. Drive groove 78 is shaped to receive driven rib 88 and fit such that, once engaged, the rib 88 and groove 78 interlock to prevent relative rotation between the drive and driven members 70, 80. Since it is unlikely that perfect rotational alignment of the coupler members 70, 80 will occur during the torque coupler engagement process, a spring-loaded feature in the lever actuator mechanism 120 urges the coupler drive and driven members 70, 80 into contact and maintains them in contact until the PTO driveline is rotated by the tractor. The initial rotation of the drive member 70 will cause the drive member to rotate relative to driven member 80 until alignment of the driven rib 88 and drive groove 78 occurs, whereupon the spring force in the lever actuator mechanism 120 will move the coupler members 70, 80 into full engagement such that drive and driven faces 72, 82 are in contact and the driven rib 88 and drive groove 78 are fully engaged. The torque coupler is fully engaged when this occurs and rotational motion of the tractor PTO 16 is generally transferred to the implement 20.

In another embodiment of the invention, the drive groove 78 and driven rib 88 are omitted. As drive and driven faces 72, 82 of the opposing coupler members are brought into contact with one another by movement of the drive member 70, the resulting friction between the drive and driven members 70C 80 allows torque to be transferred through the coupler. Friction in the torque coupler is created by the clamping force applied on the torque coupler by operation of the engagement spring 126 operating through the lever actuating mechanism 120 and coupler engagement apparatus 100, and the coefficient of friction of the drive and driven faces of the coupler members 70, 80. Torque capacity may be altered by incorporating adding a friction increasing material (e.g., material having a higher coefficient of friction value) to one or both coupler member faces 72, 82, or by varying the spring force. In the event the difficulty of lever operation becomes exceedingly great due to increased spring forces, alternate means, such as a hydraulic actuator or the like, could be used to engage the PTO engagement mechanism 90 and provide sufficient clamping force in the torque coupler 60.

Figure 7:
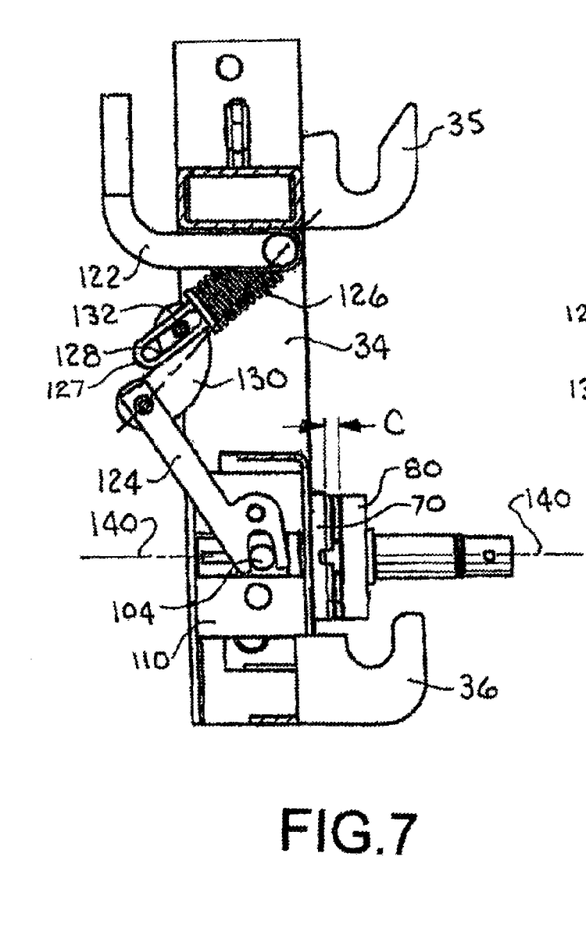
FIG. 7 is a side view of the movable fork mechanism in the engaged position with the torque coupling rotationally misaligned.
Figure 8:
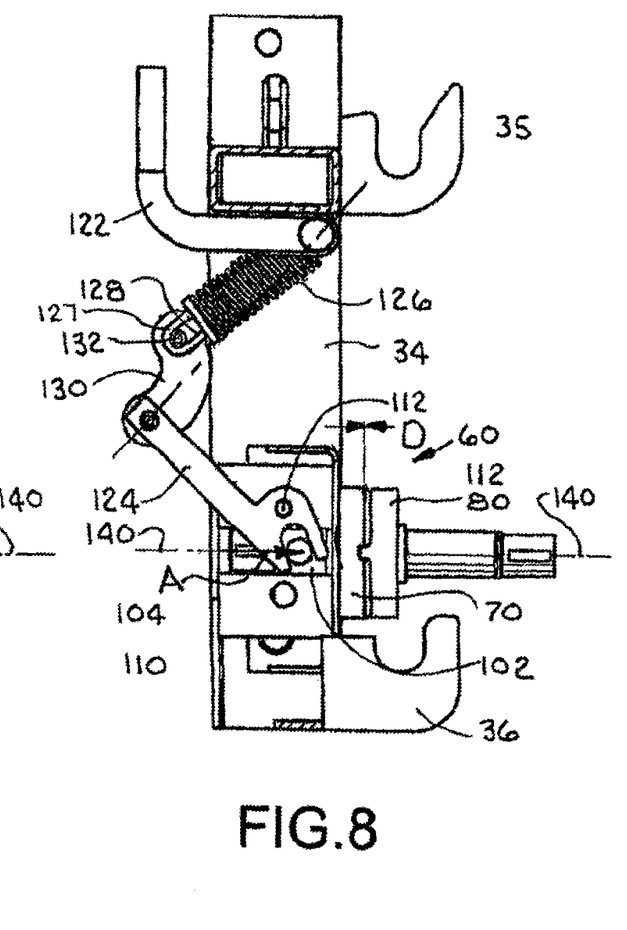
FIG. 8 is a side view of the movable fork mechanism in the engaged position.

Referring now to FIGS. 7 and 8, PTO engagement mechanism 90 is shown in the engaged position. In FIG. 7, torque coupler 60 is not rotationally aligned and thus cannot fully engage without rotating one of the coupler portions, illustrated as gap "C". Thrust bearing housing 102 is thus prevented from moving to the fully engaged (rearward) position. As lever 122 is rotated toward the engaged position, the motion compresses engagement spring 126 since positioning fork 124 and toggle link 130 is prevented from pivoting into the fully engaged position. The result is that toggle link guide 132 will move in spring guide slotted opening 128 and effectively shorten the spring guide 127 compressing engagement spring 126 thereby applying the spring force on toggle link 130 in a direction urging engagement. As the drive member 70 is rotated, positioned as shown in FIG. 8, the spring force on the toggle link 130 urges the positioning fork 124 toward the fully engaged position, moving the thrust bearing housing 102 further rearward thereby fully engaging the torque coupler 60.

It well be understood that changes in the details, materials, steps and arrangements of parts which have been described and illustrated to explain the nature of the invention will occur to and may be made by those skilled in the art upon a reading of this disclosure within the principles and scope of the invention. For example, the primary tractor/implement connection is shown as an ordinary hitch, however: a three-point hitch would work just as well. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A PTO connection module adapted to be affixed to a quick coupler hitch which is in turn adapted to connect a PTO-powered hitch-connected implement to a tractor having a three-point hitch and a PTO, the PTO connection module comprising:

a transverse frame connected to said quick coupler hitch;

a telescoping shaft having first and second opposing ends, said first end connectable to the tractor PTO;

an axis of rotation;

a PTO engagement mechanism connecting said transverse frame and said second end of said telescoping shaft, said engagement mechanism having an engaged position and a disengaged position corresponding to respective forward and rearward positions along said axis of rotational of said second end between said engaged and disengaged positions, said engagement mechanism connected to said transverse frame in a manner allowing rotational, axial, and limited radial movement of said second end; and a torque coupler having separable drive and driven members, said drive member connected to said engagement mechanism for movement between said engaged and disengaged positions, said driven portion connected to the hitch-connected implement to allow rotational motion while constraining axial and radial movement, both said members having interlocking alignment structures to radially align said drive member along said axis of rotation during movement toward said engaged position; and said PTO engagement mechanism further comprises a lever for rotating a shaft, at least one elongate spring guide connected to said shaft at one end and containing at least one spring, at least one toggle link connected to said at least one spring guide, at least one positioning fork connected to said at least one toggle link, and a thrust bearing housing having at least one positioning tab for moving said housing between said engaged and disengaged positions, connection of said at least one spring guide to said at least one toggle link allowing variation in spacing between said shaft and said toggle link, said at least one spring being disposed between said shaft and said at least one toggle link whereby said spring length varies with said variation in spacing and a spring force caused by compressing said at least one spring urges said thrust bearing housing toward said engaged position, wherein the coupler drive and driven members are moved into contact by the spring force and maintained in contact, the spring force moves the coupler members into full engagement when the drive member and driven member are rotated into alignment by the telescoping shaft.

2. The connection module of claim 1, wherein said engagement mechanism is a locking mechanism which, when in a locked position urges said drive member of said torque coupler toward alignment along said axis of rotation before said torque coupler reaches said engaged position.

3. The connection module of claim 1, wherein said drive and driven members of said torque coupler include a friction face which, when in said engaged position, transmits torque through said torque coupler.

4. The connection module of claim 1, wherein said drive and driven members include at least one interlocking drive groove and drive rib, respectively, which, when in said engaged position, prevent relative rotation between said drive and driven members.

5. The connection module of claim 1, wherein said torque coupler interlocking alignment structures comprise an alignment pin having an exterior profile aligned, when fully engaged, on said axis of rotation of said driven member, and an alignment receiver structure on said drive member, said alignment receiver structure having an interior contour matching said exterior profile of said alignment pin.

6. The connection module of claim 1, wherein said PTO engagement mechanism further comprises a hollow bearing guide channel connected to said transverse frame and a thrust bearing housing disposed within said guide channel, said bearing having at least one positioning tab, said bearing guide channel having at least one slotted guide which interacts with said positioning tab thereby guiding movement of said thrust bearing housing in generally linear directions between said engaged and said disengaged positions, said channel guide allowing radial movement of said thrust bearing housing thereby enabling said torque coupler portions to align when engaged.

7. The connection module of claim 1 wherein said PTO engagement mechanism further comprises a hollow bearing guide channel connected to said transverse frame and a thrust bearing housing disposed within said guide channel, said bearing having at least one positioning tab, said bearing guide channel having at least one slotted guide which interacts with said positioning tab thereby guiding movement of said thrust bearing housing in generally linear directions between said engaged and said disengaged positions, said channel guide further constraining said thrust bearing housing thereby accepting thrust forces applied on said thrust bearing housing by said telescoping shaft, said channel guide allowing radial movement of said thrust bearing housing thereby enabling said torque coupler portions to align when engaged.

8. A PTO connection module for a quick coupler hitch having a frame used for connecting a PTO-powered hitch-connected implement to a tractor having a three-point hitch and a PTO, the PTO connection module comprising:
    a telescoping shaft having first and second opposing ends, said first end connected to said tractor PTO:
    an axis of rotation;
    a PTO engagement mechanism connecting said hitch frame and said second end of said telescoping shaft, said engagement mechanism having an engaged position and a disengaged position corresponding to respective forward and rearward positions along said axis of rotational between said engaged and disengaged positions, the said engagement mechanism connected to a transverse frame in a manner allowing rotational, axial, and limited radial movement of said second end; and
    a torque coupler having separable drive and driven members, said drive member connected to said engagement mechanism for movement between said engaged and disengaged positions, said driven portion connected to the hitch-connected implement to allow rotational motion while constraining axial and radial movement, both said members having interlocking alignment structures to radially align said drive member along said axis of rotation during movement toward said engaged position; and
    wherein said PTO engagement mechanism further comprises a lever for rotating a shaft, at least one elongate spring guide connected to said shaft at one end and containing at least one spring, at least one toggle link connected to said at least one spring guide, at least one positioning fork connected to said at least one toggle link, and a thrust bearing housing having at least one positioning tab for moving said housing between said engaged and disengaged positions, connection of said at least one spring guide to said at least one toggle link allowing variation in spacing between said shaft and said toggle link, said at least one spring being disposed between said shaft and said at least one toggle link whereby said spring length varies with said variation in spacing and a spring force caused by compressing said at least one spring urges said thrust bearing housing toward said engaged position, wherein the coupler drive and driven members are moved into contact by the spring force and maintained in contact, the spring force moves the coupler members into full engagement when the drive member and driven member are rotated into alignment by the telescoping shaft.

9. The connection module of claim 8, wherein said engagement mechanism is a locking mechanism which, when in a locked position urges said drive member of said torque coupler toward alignment along said axis of rotation before said torque coupler reaches said engaged position.

10. The connection module of claim 8, wherein said drive and driven members of said torque coupler include a friction face which, when in said engaged position, transmits torque through said torque coupler.

11. The connection module of claim 8, wherein said drive and driven members include at least one interlocking drive groove and drive rib, respectively, which, when in said engaged position, prevent relative rotation between said drive and driven members.

12. The connection module of claim 9, wherein said drive and driven members include at least one interlocking drive groove and drive rib, respectively, which, when in said engaged position, prevent relative rotation between said drive and driven members.

13. The connection module of claim 9, wherein said PTO engagement mechanism further comprises a hollow bearing guide channel connected to said transverse frame and a thrust bearing housing disposed within said guide channel, said bearing having at least one positioning tab, said bearing guide channel having at least one slotted guide which interacts with said positioning tab thereby guiding movement of said thrust bearing housing in generally linear directions between said engaged and said disengaged positions, said channel guide further constraining said thrust bearing housing thereby accepting thrust forces applied on said thrust bearing housing by said telescoping shaft, said channel guide allowing radial movement of said thrust bearing housing thereby enabling said torque coupler portions to align when engaged.

14. The connection module of claim 8, wherein said PTO engagement mechanism further comprises a hollow bearing guide channel connected to said transverse frame and a thrust bearing housing disposed within said guide channel, said bearing having at least one positioning tab, said bearing guide channel having at least one slotted guide which interacts with said positioning tab thereby guiding movement of said thrust bearing housing in generally linear directions between said engaged and said disengaged positions, said channel guide further constraining said thrust bearing housing thereby accepting thrust forces applied on said thrust bearing housing by said telescoping shaft, said channel guide allowing radial movement of said thrust bearing housing thereby enabling said torque coupler portions to align when engaged.

15. The connection module of claim 14, wherein said drive and driven members of said torque coupler include a friction face which, when in said engaged position, transmits torque through said torque coupler.

16. The connection module of claim 15, wherein said drive and driven members include at least one interlocking drive groove and drive rib, respectively, which, when in said engaged position, prevent relative rotation between said drive and driven members.

* * * * *